United States Patent [19]  
Smaw

[11] Patent Number: 4,571,874  
[45] Date of Patent: Feb. 25, 1986

[54] CASTING BOBBER WITH PREDETERMINED DEPTH SETTING
[76] Inventor: Jesse Smaw, 10 Manor Rd., Paterson, N.J. 07514
[21] Appl. No.: 549,550
[22] Filed: Nov. 7, 1983
[51] Int. Cl.[4] .............................................. A01K 93/00
[52] U.S. Cl. ................................... 43/4.5; 43/43.14; 43/44.87; 43/44.91; 43/44.92
[58] Field of Search ................. 43/43.14, 44.87, 44.90, 43/44.91, 44.92, 44.88, 4.5

[56] References Cited
U.S. PATENT DOCUMENTS

| | | | |
|---|---|---|---|
| 771,263 | 10/1904 | McCord | 43/44.91 |
| 1,504,884 | 8/1924 | Garst | 43/44.91 |
| 1,986,441 | 1/1935 | Koepke | 43/44.91 |
| 2,326,510 | 8/1943 | Worden | 43/49 |
| 2,729,015 | 1/1956 | Finnegan | 43/44.9 |
| 2,778,147 | 1/1957 | Peck | 43/44.87 |
| 2,849,827 | 9/1958 | Gardiner | 43/44.9 |
| 3,196,575 | 7/1965 | Kotis | 43/44.87 |
| 3,455,056 | 7/1969 | Cultera | 43/44.91 |
| 4,428,143 | 1/1984 | Keller | 43/44.9 |

Primary Examiner—Nicholas P. Godici  
Assistant Examiner—C. McKee  
Attorney, Agent, or Firm—Burns, Doane, Swecker & Mathis

[57] ABSTRACT

A fishing bobber is disclosed wherein a passageway is provided in the housing of the fishing bobber to a centerline so as to permit the fishing bobber to be releasably provided on an intermediate section of the fishing line. The fishing bobber is freely received by the fishing line at the centerline of the fishing bobber. An obstruction such as a section of tubing is positioned at a preselected position of the fishing line so as to prevent movement of the fishing bobber beyond the obstruction. In another embodiment, the fishing bobber is provided with a rotatable shaft which frictionally engages the fishing line when the fishing bobber fills sufficiently with water. The extent of fishing line which passes through the fishing bobber before the fishing line is frictionally engaged by the rotatable shaft is regulated by a shutter mechanism provided in a sidewall of the fishing bobber.

21 Claims, 10 Drawing Figures

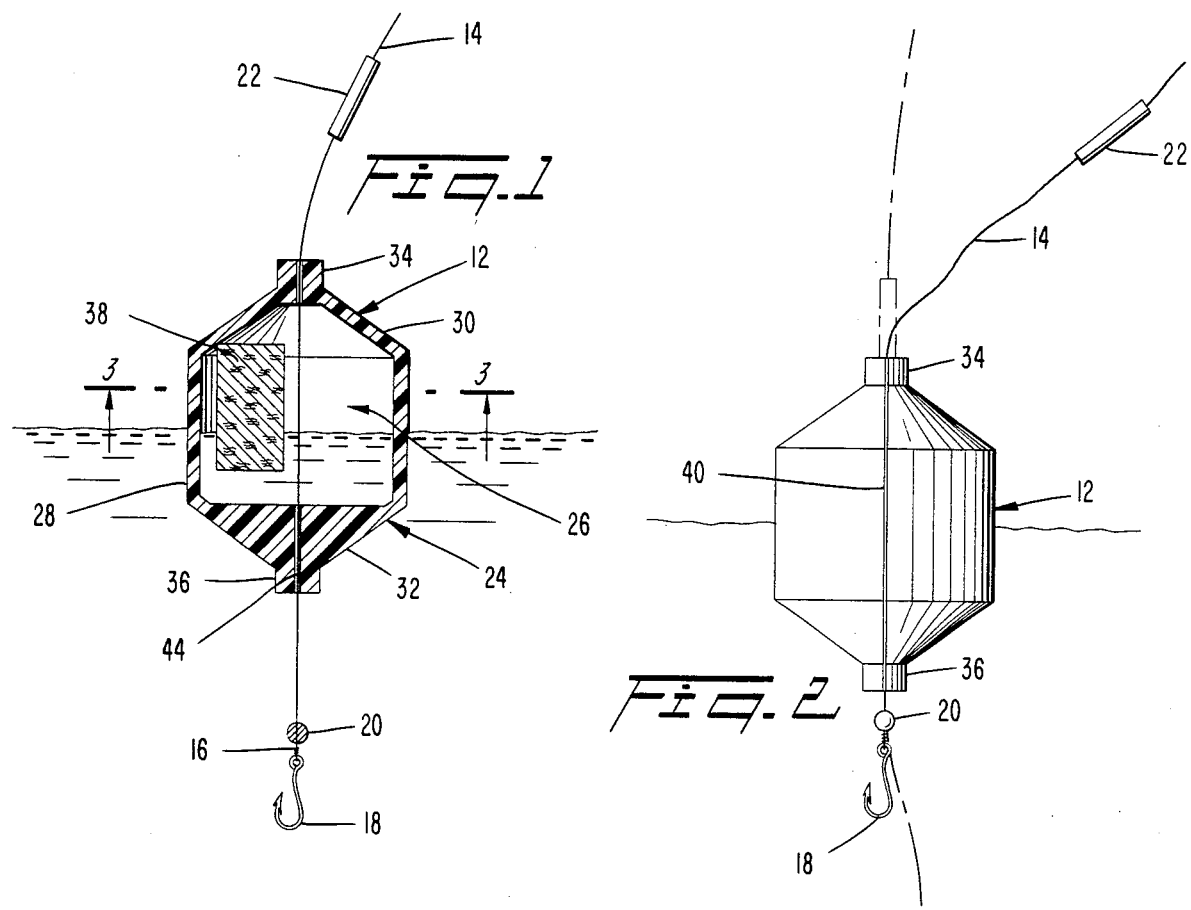
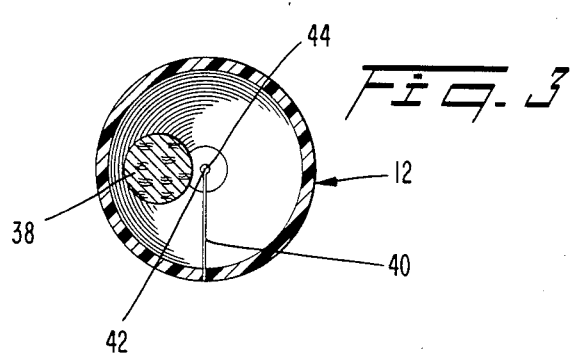
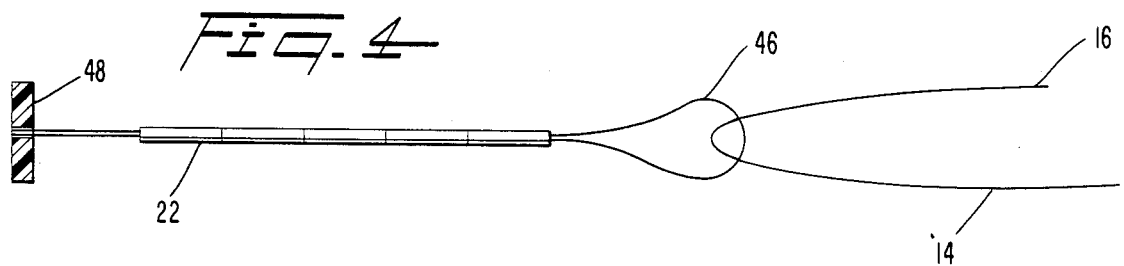
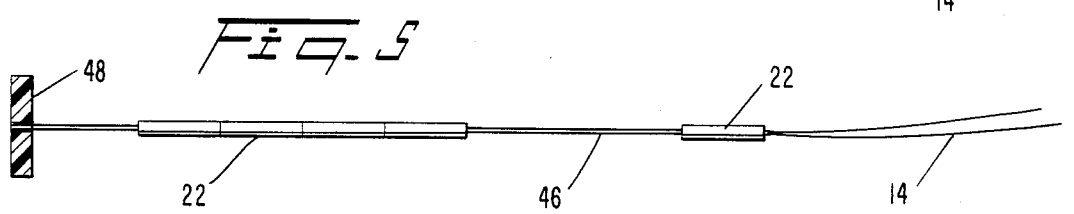

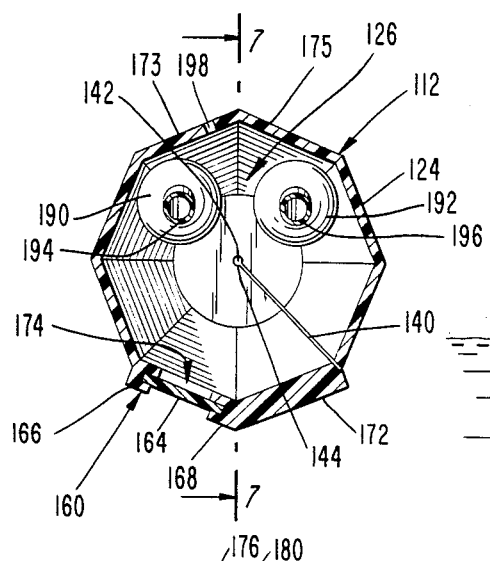
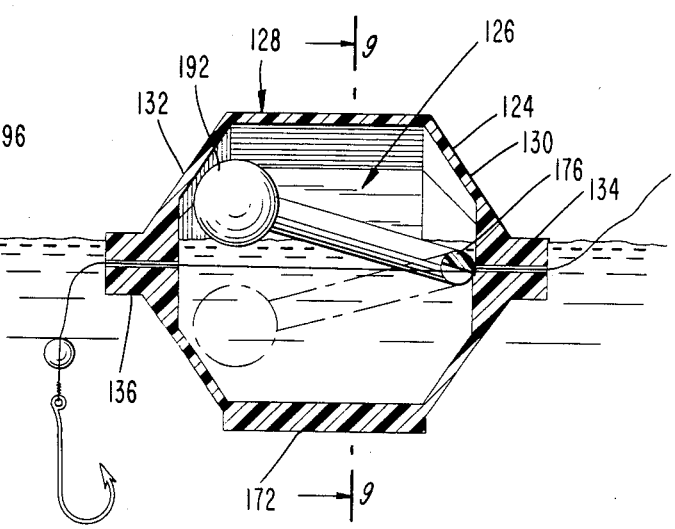
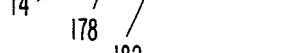
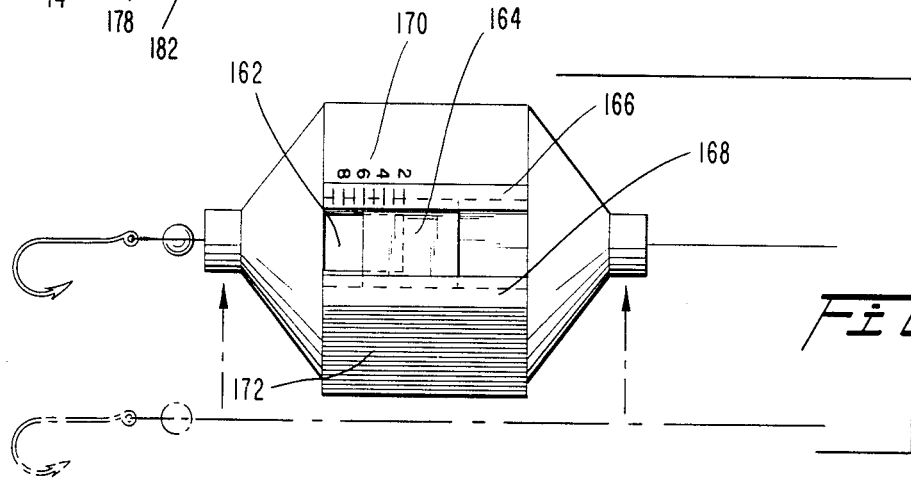
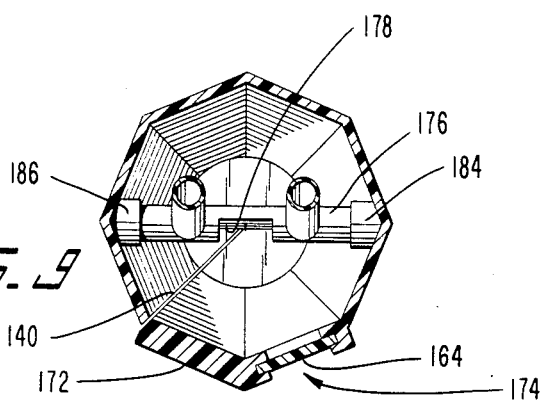

CASTING BOBBER WITH PREDETERMINED DEPTH SETTING

BACKGROUND AND SUMMARY OF THE PRESENT INVENTION

The present invention relates generally to casting bobbers and more particularly relates to casting bobbers having predeterminable depth setting arrangements.

When fishing, it is conventional to provide a bobber on the fishing line adjacent the fishing hook so as to suspend the fishing hook beneath the surface of the water anywhere from a few inches to a few feet or more. For example, when fishing in a shallow pond or stream, it may be desirable to suspend a fishing hook beneath the fishing bobber about two feet or less below the surface of the water. When fishing in deeper lakes or for example, in the ocean, it may be desirable to suspend the fishing hook a considerably greater distance beneath the surface of the water.

In addition to providing the hook and fishing bobber on the fishing line, it is typical to provide some sort of bait at the hook and also to provide various weights such as split shot or sinkers approximately adjacent to the hook on the fishing line. In this way, the weight provided by the bobber, hook, bait and sinkers together provide sufficient mass so as to enable the fishing line to be cast a desired distance away from the fisherman. Whenever the fishing bobber is positioned more than a few inches away from the end of the line, however, casting can become both dangerous and difficult due to the effect of two or more weights being provided on the fishing line during casting.

In casting, it is typical to position the fishing rod so that the free end of the fishing rod is provided rearwardly of the fisherman. The fishing rod is then snapped forwardly so as to fling the bobber, hook and bait, and sinkers forward with sufficient momentum to pull the fishing line the desired distance away from the fisherman. Because the bobber and hook (with sinkers attached) are spaced sufficiently apart from one another, the different objects provided on the end of the fishing line cause the fishing line to frequently behave erratically and unpredictably. For this reason, a significant level of skill is required in order to cast a fishing line reliably and safely.

A significant amount of the skill required in casting can be reduced if the fishing bobber could be provided immediately adjacent the hook and sinkers during casting. It is important, however, to provide an arrangement whereby the fishing bobber can subsequently be spaced the preselected distance away from the fishing hook so that the fishing hook suspends beneath the level of the water the desired extent.

Frequently, it is desired to change a fishing bobber on a fishing line without first removing the hook and sinkers from the end of the fishing line. Various spring biased arrangements are provided for releasably attaching a fishing bobber to an intermediate section of a fishing line so long as the fishing bobber is releasably secured at a particular location of the fishing line. In the known fishing bobbers wherein the fishing bobber is received on the fishing line so as to be freely slidably along the fishing line over at least a portion of the fishing line, it is required that the free end of the fishing line pass longitudinally through the fishing bobber when attaching the fishing bobber to the fishing line. Such a procedure becomes particularly cumbersome and undesirable since the various knots which are provided to secure the sinkers and fishing hooks to the fishing line must be undone. After the free end of the fishing line has been passed through the fishing bobber, then the various knots are retied so as to again attach the sinkers and fishing hooks to the free end of the fishing line.

A depth finder and fishing bobber is disclosed in U.S. Pat. No. 2,208,240 of Arnesen et al which issued on July 16, 1940 wherein the fishing line is adjustable so as to position the fishing hook a predetermined distance beyond the fishing bobber. The fishing line is initially passed axially through the fishing bobber with a sinker provided adjacent to the fishing hook. The sinker determines a lowermost position of the bobber on the fishing line. An uppermost position for the bobber is provided at the selected position on the fishing line by way of a knot. During casting, the buoyant fishing bobber is provided adjacent to the sinker and the fishing hook. After casting, the fishing line is pulled through the bobber by the hook and the sinker until the knot abuts the uppermost portion of the bobber. The interior of the bobber is open so that water may enter into the interior portion of the bobber.

In U.S. Pat. No. 2,326,510 of Worden which issued on Aug. 10, 1943, a fishing line attachment is disclosed including a fishing line which passes axially through a bobber. The bobber is provided with an interior chamber having a bead which is provided within the chamber. The bead is buoyant so that the bead will rise in the chamber as the chamber fills with water. As the bead rises in the chamber, the bead will frictionally engage the fishing line and thereby position the bobber on the line. During casting, the bobber is initially provided adjacent to the lowermost portion of the fishing line. When a sinker of the fishing line has touched bottom, the bead will rise and engage the fishing line so as to prevent further movement of the fishing line through the bobber. In U.S. Pat. No. 2,785,499 of Simpson which issued on Mar. 19, 1957 and in U.S. Pat. No. 2,609,634 of Simpson which issued on Sept. 9, 1952, fishing bobbers are disclosed wherein the fisherman can selectively fix the bobber with respect to the fishing line after casting. The fisherman applies a sudden pull to the fishing line so as to offset a rotatable member of the fishing bobber with respect to the central axis of the fishing bobber. In this way, the rotatable member will frictionally engage the fishing line and thereby fix the fishing line with respect to the bobber. During casting, the bobber is provided adjacent to the hook and sinker of the fishing line with the line then allowed to pass through the bobber a desired extent.

In U.S. Pat. No. 3,672,087 of Milburn, Jr., which issued on June 27, 1972, a fishing bobber mechanism is disclosed including a latch which is provided to activate a mechanism that releasably fixes the fishing bobber on the fishing line. The bobber includes a spring biased plunger which is maintained in a first position by a latch. Upon a rapid upward movement of the line, the spring biased plunger is released so as to frictionally engage the line. When casting, the fishing bobber is initially provided adjacent to the hook and sinker. When the fisherman has determined that a desired amount of line has passed through the bobber, the fisherman manually trips the latch by pulling rapidly on the line to release the plunger.

Other fishing bobbers of interest are disclosed in U.S. Pat. No. 2,221,437 of Allison which issued on Nov. 12, 1940 and in U.S. Pat. No. 2,226,331 of Allison which issued on Dec. 24, 1940. Accordingly it is an object of the present invention to provide a casting bobber which is slidably received on an intermediate portion of a fishing line which bobber is initially provided adjacent the fishing hook during casting and which subsequently moves to a predetermined position on the fishing line.

Another object of the present invention is to provide a fishing bobber wherein a section of tubing is provided on the fishing line at a preselected location to prevent movement of the fishing bobber beyond a predetermined length of the fishing line.

Still another object of the present invention is to provide a fishing bobber wherein the fishing bobber may be releasably secured on the fishing line along a longitudinal axis of the fishing bobber without first removing the hook from the free end of the fishing line.

Still another object of the present invention is to provide a fishing bobber having a mechanism whereby the depth at which the hook is suspended beneath the bobber can be determined by adjusting a shutter mechanism on the fishing bobber.

Still another object of the present invention is to provide a fishing bobber wherein the fishing line is selectively releasably engaged by the fishing bobber without providing an obstruction on the fishing line. These and other objects of the present invention are realized by a fishing bobber according to the present invention including a housing having a hollow interior which defines a chamber within the housing. The housing is provided with a top end and a bottom end with a passageway provided for receiving a fishing line. The passageway is adapted so as to releasably secure the housing on the fishing line with the housing being freely slidable along the fishing line. A continuous opening extends along the wall of the housing from the top end to the bottom end with the fishing line selectively urged into the housing at an intermediate section of the fishing line. The fishing bobber is provided with a flotation arrangement so as to render the fishing bobber buoyant.

According to a first preferred embodiment of the present invention, a section of tubing is provided on the fishing line at a predetermined position. Movement of the fishing bobber along the fishing line is obstructed by the tubing at the preselected location along the fishing line. The tubing is preferably provided on the fishing line by passing a free end of the fishing line through a wire loop on which sections of tubing have been provided. One of the sections of tubing is then urged from the wire loop onto a loop formed by the fishing line. Afterwards, the free end of the fishing line is pulled through the tubing so as to position the tubing on a single strand of the fishing line. The tubing is then slid along the line to the preselected location.

In another preferred embodiment of the present invention, a fishing bobber housing is hollow so as to define a chamber within the housing. A passageway extends through the housing from the top end of the fishing bobber to the bottom end of the fishing bobber. A rotatable shaft is provided within the chamber with one or more floats rigidly attached to the shaft. An adjustable shutter is provided in the housing so as to regulate a flow of water into the chamber of the housing. As the bobber fills with water, rotation of the shaft is caused by the movement of the float attached to the shaft. The rotation of the shaft engages the fishing line so as to selectively position the fishing bobber along the line.

BRIEF DESCRIPTION OF THE DRAWINGS

Preferred embodiments of the fishing bobber according to the present invention will be described with reference to the accompanying drawings wherein like members bear like reference numerals and wherein:

FIG. 1 is a side view in cross section of a preferred embodiment of the fishing bobber according to the present invention releasably secured to a fishing line;

FIG. 2 is a side view of the fishing bobber according to the present invention showing movement of the fishing line through the fishing bobber from an initial position to a subsequent position (as shown in phantom):

FIG. 3 is a view through the line 3—3 of FIG. 1;

FIG. 4 is a side view of an arrangement for providing a section of tubing on a fishing line;

FIG. 5 is a view showing movement of the section of tubing onto the fishing line;

FIG. 6 is a top view in cross section of a second preferred embodiment of a fishing bobber according to the present invention;

FIG. 7 is a view through the line 7—7 of FIG. 6;

FIG. 7a is an enlarged view of a portion of FIG. 7;

FIG. 8 is a side view of the fishing bobber of FIG. 6 showing insertion of an intermediate section of a fishing line into a slot of the fishing bobber; and FIG. 9 is a view through the line 9—9 of FIG. 7.

DETAILED DESCRIPTION OF THE PREFERRED EMBODIMENTS

With reference to FIG. 1, a fishing bobber 12 according to a first preferred embodiment of the present invention is provided on a fishing line 14. The fishing line 14 has a free end 16 with a fishing hook 18 and one or more sinkers such as split shot 20 being provided adjacent the hook 18.

The fishing hook 18 and the split shot are of conventional design and are well known in the art. Likewise, the fishing line is any of a wide variety of suitable, conventional fishing lines such as, for example, four to ten pound test monofilament fishing line having a thickness of slightly less than 0.015 inches in diameter. The fishing line 14 is attached in a suitable, conventional manner to a reel of a fishing rod (not shown) in a manner which will be readily apparent to one skilled in the art.

A section of tubing 22 (which will be discussed in more detail with reference to FIGS. 4 and 5 below) is provided at a preselected location of the fishing line a suitable distance away from the free end 16 of the fishing line. The tubing 22 (shown in enlarged size for clarity of illustration in the drawings) will serve as an upper limit for movement of the fishing bobber 12 along the fishing line 14 and suitable distances for the position of the tubing 22 along the fishing line will be anywhere from a few inches to a few feet or more depending upon the type of fishing and the depth of water encountered during the fishing.

The fishing bobber 12 is preferably of any suitable lightweight and sturdy material such as plastic. The fishing bobber 12 includes a housing 24 which defines a hollow chamber 26 provided within the housing 24. In the preferred embodiment of FIG. 1, the housing 24 includes a cylindrical main section 28 having conical upper and lower portions 30, 32. The upper conical portion 30 is preferably hollow so as to decrease the weight of the bobber at the top end of the bobber. The upper conical portion 30 preferably ends in a solid cylindrical portion 34. The lower conical portion 32 is preferably made of solid plastic or is provided with a dense material such as lead (not shown) so as to provide a weighted lowermost portion for the bobber. The lower conical portion 32 is preferably provided with a solid cylindrical portion 36 at the lowermost portion of the bobber 12.

Other configurations for the bobber are contemplated as being within the scope of the present invention. For example, the main body portion of the fishing bobber 12 may be spherical in configuration with or without upper and lower solid cylindrical portions 34, 36. Other configurations for the fishing bobber will be readily apparent to one skilled in the art upon reading the present specification.

Within the chamber 26 is provided a flotation member 38. The flotation member 38 is preferably of a highly buoyant material such as cork. Alternatively, the buoyant member 38 may be made of a lightweight plastic material having a hollow interior. The buoyant material 38 is preferably of a sufficient size so as to render the bobber 12 buoyant even when the bobber 12 is otherwise filled with water. Furthermore, it is preferable that the buoyant member 38 be sufficient so as to render the bobber, fishing line, hook 18, split shot 20 and bait buoyant when placed in water.

The buoyant member 38 may either be fixedly secured to a sidewall of the interior of the bobber or the buoyant member 38 may be freely received within the chamber of the bobber. If the buoyant member 38 is freely received within the chamber 26 of the bobber, it is preferable that the buoyant member 38 have a diameter which is less than one-half of the inside diameter of the fishing bobber 12 so as not to obstruct the fishing line 14.

The flotation member 38 may be of any suitable configuration such as for example, cylindrical or spherical or annular. If annular, however, it is preferable that the flotation member be rigidly secured to the interior of the fishing bobber so that an appropriate passageway can be provided in the flotation material to receive the fishing line.

The fishing bobber 12 is provided with a passageway 40 which is provided so as to receive the fishing line 14. The passageway 40 (shown in enlarged size in the drawings for clarity of illustration) is configured so as to releasably secure the housing on the fishing line with the housing being freely slidable along the fishing line. The passageway includes a continuous opening which extends along a wall of the housing from the top end member 34 to the bottom end member 36. With reference to FIG. 3, the passageway 40 is shown as extending radially from a central axis 42 of the fishing bobber outwardly through the outer wall of the fishing bobber.

The passageway 40 comprises a slit extending through the fishing bobber (and an annular flotation material if provided within the interior of the bobber). The slit 40 extends continuously radially in one direction from a central axis of the fishing bobber. Preferably, the side walls of the bobber are resiliently urged against one another so that the passageway 40 is normally closed. In use, the sidewalls of the bobber are urged away from one another as the fishing line is urged into or out of the passageway 40. The bobber is preferably sufficiently resilient so that the passageway 40 can open up enough to receive typical fishing lines of various thicknesses.

The slit 40 is preferably provided with an enlarged passageway 44 at the axis 42 of the fishing bobber with the size of the opening 44 being slightly greater than 0.015 inches in diameter. For purposes of illustration, the passageway 40 is shown in FIG. 3 as having a particular opening thickness. It should be understood that the adjacent walls of the bobber are normally in contact with one another but can easily be separated so as to allow the passage of the fishing line. In this way, the fishing line 14 is snugly received by the slot 40 while the fishing bobber is being releasably secured on the fishing line 14. By applying a slight amount of pressure, the passageway 40 will be opened sufficiently so as to receive the fishing line 14. Once the fishing line has reached the central axis 42 of the fishing bobber and the slightly enlarged opening 44, the fishing bobber will be freely slidable along the fishing line.

With reference now to FIG. 2, the fishing line 14 and the bobber 12 are shown in bold lines at an initial configuration immediately after casting of the fishing line has occurred. The tubing 22 is located at a preselected distance away from the hook 18 with the hook and split shot 20 being initially adjacent the lowermost end of the fishing bobber 12. The weight of the split shot 20, the hook 18 and any bait provided on the fishing hook 18 will pull the fishing line through the bobber 12 until the tubing 22 abuts the uppermost end 34 of the fishing bobber. At this time, further downward movement of the fishing hook 18 and fishing line 14 through the fishing bobber will be prevented by abutment of the tubing 22 with the uppermost end of the fishing bobber 12 (see illustration in phantom).

While the fishing bobber is located in water, the fishing bobber will likely begin to fill with water through the passageway 40. The flotation material 38 is preferably sufficiently great so as to maintain buoyancy of the fishing bobber, hook 18 and split shot 20 along with any bait attached to the hook 18. If desired, the fishing bobber 12 may be initially provided with a predetermined amount of water within the chamber of the housing prior to casting so that the weight of the water will act as additional weight during the casting operation.

If desired, the housing 24 of the bobber 12 may be substantially solid with the exception of the slot 40 so long as the housing is of a sufficiently buoyant material so as to remain at the surface of the water as desired. Because of the significantly increased friction resulting from a substantially solid bobber, the passageway 44 provided along the axis 42 of the bobber should be increased in size a corresponding amount so as to permit the casting bobber to slide freely along the fishing line 14. The housing 24 may also be comprised of portions having different buoyancies with the housing defining an interior chamber 26 which is hollow.

With reference to FIG. 4, a plurality of sections of tubing 22 are provided on a loop of thread 46. The loop of thread 46 may be fixedly attached on one side of the plurality of sections of tubing 22 to a member 48. Alternatively, the ends of the loop of thread 46 may be tied to one another or may remain free as desired. In the preferred embodiment, a four to ten pound test monofilament fishing line 14 is utilized with the bobber according to the present invention. In the preferred embodiment, the sections of tubing 22 are preferably of gum rubber having a normal inside diameter of 0.004 inches and a normal outside diameter of 0.015 inches. The thread 46 then preferably has a diameter of 0.003 inches. Other sizes and materials for the tubing and thread can be utilized depending upon the type of fishing line being utilized. These differences will be readily apparent to one skilled in the art upon reading the present specification. (It should be noted that the sections of tubing 22 are not shown to scale and are illustrated in enlarged form for purposes of illustration.)

In order to provide a section of tubing 22 on the fishing line 14, the free end 16 of the fishing line is first passed through the loop of the thread 46. In this way, the fishing line 14 forms a loop which passes through the loop of the thread 46. With reference now to FIG. 5, one of the sections of tubing 22 is then urged along the loop of thread 46 onto the loop formed by the fishing line 14. The section of tubing 22 is then urged further along the fishing line 14 until the free end 16 of the fishing line is no longer received within the section of tubing 22. At this time, the free end 16 of the fishing line is withdrawn from the loop of thread 46.

The section of tubing 22 can be urged along the fishing line manually so as to selectively position the section of tubing at the predetermined location along the fishing line. During placement of the tubing on the fishing line, the internal diameter of the tubing will expand sufficiently so as to receive the fishing line 14. Sufficient resiliency will be provided so as to maintain the section of tubing along the line as desired. Likewise, the outer diameter of the section of tubing will expand a corresponding amount when positioned on the fishing line 14 with the result that the outside diameter of the tubing will be somewhat greater than 0.015 inches in diameter. In this way, the tubing 22 will not pass through the opening 44 of the slot 40 when the tubing 22 is provided on the fishing line 14.

In use, a section of tubing 22 is first positioned on the fishing line 14 at a location sufficiently remote from the free end 16 of the fishing line so as to enable the fishing hook 18 to extend a desired distance beneath the fishing bobber 12 when the bobber is located at the surface of the water. The fishing hook 18 and split shot as needed are then provided on the free end of the fishing line 14 in any suitable, conventional configuration. A section of the fishing line intermediate of the tubing 22 and the free end 16 of the fishing line is then urged into the slot 40 of the fishing bobber 12 until the fishing line 14 is releasably received along the opening 44. At this time, the fishing bobber 12 is freely slidable along the fishing line 14 between the split shot 20 and the tubing 22.

As desired, the fishing bobber may be filled with a quantity of water so as to provide additional weight at the free end of the fishing line. The fishing bobber is then positioned adjacent to the split shot 20 and the fishing bobber, hook and split shot are cast in any suitable, conventional manner.

When the bobber comes to rest at the surface of the water, the weight of the fishing hook 18, split shot 20 and any bait provided on the hook 18 will pull the fishing line 14 through the fishing bobber along the opening 44. Eventually, the tubing 22 will abut the uppermost end 34 of the fishing bobber 12 with the result that further movement of the line 14 through the fishing bobber is prevented.

As desired, the fishing bobber may then be removed from the fishing line 14 by pulling the intermediate section of the fishing line through the slot 40 of the housing. A different fishing bobber according to the present invention can then be provided on the intermediate section of the fishing line without first removing the split shot 20 and fishing hook 18 from the free end of the fishing line 16.

If desired, the section of tubing 22 can be replaced by any other suitable obstruction in the line 14 such as for example, a knot which is provided at the predetermined location along the fishing line 14.

With reference now to FIG. 6, a second preferred embodiment of a fishing bobber 112 according to the present invention includes a housing having a mid-section 128 which is octagonal in cross-section. With reference to FIG. 7, the housing 124 is provided with first and second conical ends 130, 132. By definition, the conical end 130 is defined as the upper end of the fishing bobber 124 since the other end 132 is provided closest to the fishing hook (not shown). The housing 124 is arranged so as to define an interior chamber 126 which is hollow. The upper and lower conical portions 130, 132 are each provided with cylindrical ends 134, 136. The upper and lower conical portions 130, 132 may be hollowed to an appropriate amount depending upon the size of the fishing bobber and the level of buoyancy desired for the bobber.

With reference again to FIG. 6, a passageway 140 is provided in the housing 124 completely through the housing to a centerline of the float. The passageway 140 includes a slit which is provided throughout the housing continuously in one direction radially outwardly from a centerline of the housing. The passageway 140 preferably is formed by adjacent side edges of walls of the bobber which side edges are resiliently urged against one another. The passageway 140 also includes an enlarged passageway 144 at the centerline 142 of the bobber so that the fishing line may freely slide through the opening 144 at the centerline of the bobber.

A shutter 160 is provided in one of the sidewalls of the octagonal housing of the fishing bobber 112. The shutter includes an opening 162 (see FIG. 8) and a slidable door 164. The slidable door is frictionally received by first and second flanges 166, 168 which retain the door 164 adjacent the panel of the housing. Furthermore, the door 164 is frictionally engaged by the flanges 166, 168 so as to releasably maintain the door 164 at a particular location along the flanges 166, 168. In this way, the opening 162 of the shutter can be selectively varied as desired.

One or both of the flanges 166, 168 is preferably provided with graduations 170 so as to indicate the extent of opening of the passageway 162. The opening 162 permits communication with the interior chamber of the fishing bobber.

Immediately adjacent the panel of the octagonal housing containing the shutter mechanism 160 is a panel 172 having an increased thickness corresponding to the thickness of the flanges 166, 168. In this way, the panel 172 has a mass which is approximately equal to the mass of the panel 174 including the flanges 166, 168 and the shutter mechanism 160. Because of the increased weight of the panels 172, 174, the fishing bobber 112 will assume a stable configuration in the water with the panels 172, 174 oriented downwardly. If desired, additional counterweights can be provided in the fishing bobber 112 so as to orient the fishing bobber with the panels 172, 174 downwardly when the fishing bobber 112 is floating at the surface of the water.

With reference to FIG. 7, a shaft 176 is rotatably received within the chamber of the fishing bobber 112 adjacent an interior wall of the upper conical section 130. The shaft 176 is provided with a notch 178 at a midsection of the shaft 176 with the notch 178 being located adjacent the passageway or opening 144. The inner surface of the upper cylindrical portion 130 is provided with a recess 180 which is arranged to permit the shaft 176 to engage a shoulder 182 of the innerwall of the upper conical portion of the housing 130 upon rotation of the shaft 176. When the fishing line 14 is received within the opening 144, rotation of the shaft 176 causes the fishing line 14 to be frictionally engaged between the shaft 176 and the shoulder 182 (see also FIG. 9).

Outer ends of the shaft 176 are received within cups 184, 186 so as to permit the shaft 176 to rotate freely within the cups. A pair of floats 190, 192 are provided at the ends of arms 194, 196 which extend radially outwardly from the shaft 176. The arms 194, 196 are arranged so that the shaft 176 does not frictionally engage the fishing line 14 when the floats 190, 192 are adjacent the panels 172, 174. As the inner chamber of the fishing bobber fills with water, however, the floats 190, 192 rise towards panels 173, 175 so as to rotate the shaft 176 and frictionally engage the line 14 against the shoulder 182.

The floats 190, 192 may be of any suitable material having sufficient buoyancy so as to maintain the fishing bobber at the surface of the water even when the remaining portion of the inner chamber of the fishing bobber is filled with water.

With reference to FIG. 7, rotation of the shaft 176 upon upward movement of the float 190, 192 is shown. With reference again to FIG. 9, the passageway 140 is provided on the same side of the shaft 176 as the notch 178 so as to permit the fishing line 14 to be passed through the slot 140 at an intermediate section of the fishing line. So that the rotation of the shaft 176 does not urge the fishing line 14 outwardly through the passageway 140, the passageway is preferably located at an angle other than perpendicular to the shaft. A convenient location for the passageway 140 is adjacent a side of the panel 172 which is not adjacent to the panel 174.

In operation, an intermediate section of the fishing line 14 is urged through the passageway 140 until the fishing line 14 is received within the opening 144 which passes axially through the fishing bobber. The passageway 140 is formed by side edges of the bobber which are resiliently urged toward one another. The passageway 144 preferably has a width which is slightly greater than the outside diameter of the fishing line 14 so that the fishing line 14 is freely received within the passageway 144. A free end of the fishing line 14 may be provided prior to passing through the slot 140 with a fishing hook, fishing bait and split shot or other sinkers in any suitable conventional manner which is readily known to one skilled in the art.

An opening in a sidewall of the fishing bobber is varied by moving a door so as to open or close the opening in the sidewall of the fishing bobber. If desired, a quantity of water may be admitted to the interior of the fishing bobber prior to casting.

As desired, the fishing line with the fishing bobber, hook and split shot is cast using a fishing rod in a conventional manner as by positioning a free end of the fishing rod behind the fisherman. The fishing rod is then quickly snapped forward so as to propel the fishing bobber, fishing hook and split shot forward away from the fisherman. During casting, it is preferable that the fishing bobber be positioned immediately adjacent the split shot or fishing hook at the free end of the fishing line.

When the bobber comes to rest at the surface of the water, a weighted portion of the bobber will be oriented downwardly with the shutter mechanism oriented beneath the level of the water. The housing is preferably provided with an air hole 198 opposite the shutter so as to permit the water to enter the interior of the fishing bobber through the shutter opening.

The opening in the shutter was varied so as to permit a sufficient amount of time to pass before the interior of the fishing bobber has substantially filled with water. At this time, the floats in the interior of the fishing bobber will have risen sufficiently so as to rotate the shaft which carries the floats. The rotation of the shaft will cause the fishing line to be frictionally engaged between a notch of the shaft and a shoulder of the housing. Until the fishing bobber has substantially filled with water, the weight of the fishing hook, bait and split shot will pull the fishing line through the bobber. When the fishing bobber has substantially filled with water, the rotation of the shaft 176 will frictionally engage the fishing line 14 so as to prevent further movement of the fishing line 14 through the bobber 112.

When the fishing line has been reeled in by the fishermen, the bobber 112 can be readily released from the fishing line 14 by pulling the fishing line through the slot 140. If desired, the fishing bobber can be retained on the fishing line and all or a portion of the water contained by the fishing bobber may be removed prior to again casting the fishing line.

Since in the embodiment of FIGS. 6-9 the movement of the floats within the fishing bobber regulates the depth at which the fishing hook will descend beneath the fishing bobber, it is not necessary to provide a tubing or other obstruction at a predetermined location of the fishing line.

The fishing bobber of FIGS. 6-9 may be constructed of any suitable material such as plastic.

The principles and preferred embodiments of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the scope of the present invention as defined in the appended claims be embraced thereby.

What is claimed is:

1. A fishing bobber system comprising:
    a fishing bobber including a housing having a hollow interior defining a chamber within said housing, said housing having a top end and a bottom end;
    passageway means for receiving a fishing line, said passageway means being adapted to releasably secure said housing on said fishing line with said housing being freely slidable along said fishing line, said passageway means including a continuous, resiliently closable opening formed in said housing, said resilient opening extending along said housing from said top end to said bottom end whereby said fishing line may be urged into said housing at an intermediate section of the fishing line; and floatation means within said chamber as the primary source of buoyancy for said fishing bobber.

2. The fishing bobber system of claim 1 wherein said housing is of plastic.

3. The fishing bobber system of claim 1 wherein said housing is symmetrical about an axis passing through said top end and said bottom end, said housing being freely slidable on said fishing line along said axis.

4. The fishing bobber system of claim 1 wherein at least a portion of said housing has a density substantially less than the density of water.

5. The fishing bobber system of claim 3 wherein said housing is of plastic.

6. The fishing bobber system of claim 1 further comprising means for selectively limiting movement of said housing along said fishing line when said housing is releasably secured on said fishing line.

7. The fishing bobber system of claim 6 wherein said means for selectively limiting movement includes a tubing provided on said fishing line a preselected distance away from a free end of the fishing line, the fishing line being received within the tubing, said tubing having an outside diameter sufficiently great so as to not pass through said passageway means when said tubing is provided on said fishing line.

8. The fishing bobber system of claim 5 further comprising:
means for selectively limiting movement of said housing along said fishing line when said housing is releasably secured on said fishing line, said means for selectively limiting movement including a tubing provided on said fishing line a preselected distance away from a free end of the fishing line, the fishing line being received within the tubing, said tubing having an outside diameter sufficiently great so as to not pass through said passageway means when said tubing is provided on said fishing line.

9. A fishing bobber comprising:
a housing having a hollow interior defining a chamber within said housing, said housing having a top end and a bottom end;
passageway means for receiving a fishing line, said passageway means being adapted to releasably secure said housing on said fishing line with said housing being freely slidable along said fishing line, said passageway means including a continuous opening extending along said housing from said top end to said bottom end whereby said fishing line may be urged into said housing at an intermediate section of the fishing line;
flotation means for rendering said fishing bobber buoyant, said flotation means including at least one float mounted on a shaft for rotation about an axis of the shaft, whereby said housing is releasably fixed with respect to said fishing line upon rotation of said shaft.

10. The fishing bobber of claim 9 wherein said shaft includes a notched portion which is adapted to functionally engage said fishing line upon rotation of said shaft.

11. A fishing bobber comprising:
a housing having a hollow interior defining a chamber within said housing, said housing having a top end and a bottom end;
passageway means for receiving a fishing line, said passageway means being adapted to releasably secure said housing on said fishing line with said housing being freely slidable along said fishing line, said passageway means including a continuous opening extending along said housing from said top end to said bottom end whereby said fishing line may be urged into said housing at an intermediate section of the fishing line; and
flotation means for rendering said fishing bobber buoyant, said flotation means including a pair of floats mounted on a common shaft for rotation about an axis of the shaft, said floats and said shaft being mounted within said chamber of said housing, said axis of said shaft being perpendicular to said axis passing through said top end and said bottom end of said housing, one of said floats being provided on either side of a notch in said shaft, said notch being adapted to frictionally engage said fishing line upon rotation of said shaft to releasably fix said housing with respect to said fishing line.

12. The fishing bobber of claim 11 further comprising:
a shutter adapted to selectively regulate a rate at which water may enter said chamber of said housing, said shutter including an opening in said housing and a closure member which is selectively positionable so as to vary the size of said opening in said housing.

13. The fishing bobber of claim 12 wherein said shutter is provided on the same side of said shaft as said notch.

14. The fishing bobber of claim 13 wherein said shutter includes indicating means for indicating a size of said opening.

15. The fishing bobber of claim 11 wherein said passageway means includes a slot provided in said housing, said slot being provided on the same side of said shaft as said notch and said slot being defined by side edges of the housing which are resiliently urged into contact with one another.

16. The fishing bobber of claim 12, wherein said passageway means include a slot provided in said housing, said slot being provided on the same side of said shaft as said notch and said shutter, said slot being defined by side edges of the housing which are resiliently urged into contact with one another.

17. A fishing bobber comprising:
a housing having a hollow interior defining a chamber within said housing, said housing having a top end and a bottom end;
passageway means for receiving a fishing line, said passageway means being adapted to releasably secure said housing on said fishing line with said housing being freely slidable along said fishing line, said passageway means including a continuous opening extending along said housing from said top end to said bottom end whereby said fishing line may be urged into said housing at an intermediate section of the fishing line;
flotation means for rendering said fishing bobber buoyant;
means for selectively limiting movement of said housing along said fishing line when said housing is releasably secured on said fishing line including a shaft mounted in said chamber for rotation about an axis of the shaft, said shaft having a notch adapted to selectively engage said fishing line; and wherein said flotation means includes at least one float mounted on said shaft within said chamber.

18. The fishing bobber of claim 17 wherein said flotation means includes a pair of floats mounted on said shaft with one of said floats being provided on either side of said notch.

19. A method of using a fishing bobber on a fishing line comprising the steps of:
attaching a hook to a free end of a fishing line;

urging an intermediate section of said fishing line through a slot in said fishing bobber;
releasably maintaining said fishing bobber on said fishing line with said fishing bobber being freely slidable along said fishing line;
selectively positioning said fishing bobber adjacent said hook;
providing a plurality of sections of tubing on a loop of wire with said loop extending beyond said plurality of sections of tubing;
passing a free end of said fishing line through said loop of wire to provide a loop of said fishing line;
urging one of said sections of tubing onto said loop of said fishing line intermediate of the ends of said fishing line;
urging said section of tubing along said fishing line beyond a free side of the loop of the fishing line;
positioning said section of tubing on said fishing line at a preselected location; and
abutting said section of tubing with said fishing bobber to prevent movement of said fishing bobber beyond said preselected distance.

20. A method of using a fishing bobber on a fishing line comprising the steps of:
attaching a hook to a free end of a fishing line;
urging an intermediate section of said fishing line through a slot in said fishing bobber;
releasably maintaining said fishing bobber on said fishing line with said fishing bobber being freely slidable along said fishing line;
selectively positioning said fishing bobber adjacent said hook;
admitting water to an interior portion of said fishing bobber;
rotating a shaft having a float provided on the shaft within said interior portion of said fishing bobber with said admitted water; and
frictionally engaging said fishing line with said rotated shaft to prevent movement of said fishing bobber beyond said preselected distance.

21. The method of claim 20 further comprising the step of:
initially adjusting a shutter of said housing to selectively vary a rate at which said water is admitted to said interior portion of said housing.

* * * * *